(12) United States Patent
Cheng

(10) Patent No.: US 9,116,295 B2
(45) Date of Patent: Aug. 25, 2015

(54) DEFORMABLE LENS ASSEMBLY

(75) Inventor: Kwok Sing Cheng, Tuen Mun (HK)

(73) Assignee: HONG KONG APPLIED SCIENCE AND TECHNOLOGY RESEARCH INSTITUTE CO. LTD., Shatin, New Territories ( * ) Notice: Subject to any disclaimer, the term of this patent is extended or adjusted under 35 U.S.C. 154(b) by 544 days.

(21) Appl. No.: 13/150,874

(22) Filed: Jun. 1, 2011

(65) Prior Publication Data

US 2012/0307384 A1 Dec. 6, 2012

(51) Int. Cl.
*G02B 7/02* (2006.01)
*G02B 3/14* (2006.01)
*G02B 26/00* (2006.01)

(52) U.S. Cl.
CPC ............... *G02B 3/14* (2013.01); *G02B 26/004* (2013.01); *Y10T 156/1028* (2015.01)

(58) Field of Classification Search
CPC ........ G02B 3/14; G02B 26/0825; G02B 7/10; G02B 7/36; G02B 7/04; G02B 26/00; G02B 7/182; G02B 7/028; G02B 17/08; G02B 3/12; H04N 5/2254; H04N 5/2251; H04N 5/2328; H04N 13/0427; H04N 13/0493
USPC .............. 359/811, 815, 813, 819–824, 196.1, 359/198.1, 199.2–199.4, 200.6–200.8, 290, 359/291
See application file for complete search history.

(56) References Cited

U.S. PATENT DOCUMENTS

| | | | |
|---|---|---|---|
| 5,672,001 A * | 9/1997 | Bertling et al. | 362/278 |
| 7,295,390 B2 | 11/2007 | Miki | |
| 7,725,016 B2 | 5/2010 | Lee | |
| 2009/0141365 A1 | 6/2009 | Jannard | |
| 2010/0231783 A1 * | 9/2010 | Bueler et al. | 348/347 |

* cited by examiner

*Primary Examiner* — Joseph P Martinez
*Assistant Examiner* — Brandi Thomas
(74) *Attorney, Agent, or Firm* — Berkeley Law & Technology Group, LLP

(57) ABSTRACT

The subject matter disclosed herein relates to an imaging device having a deformable lens.

16 Claims, 4 Drawing Sheets

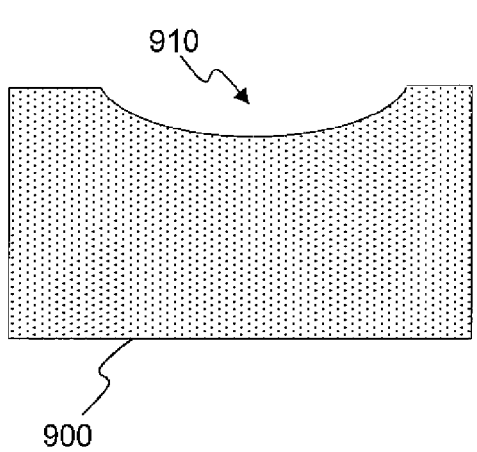
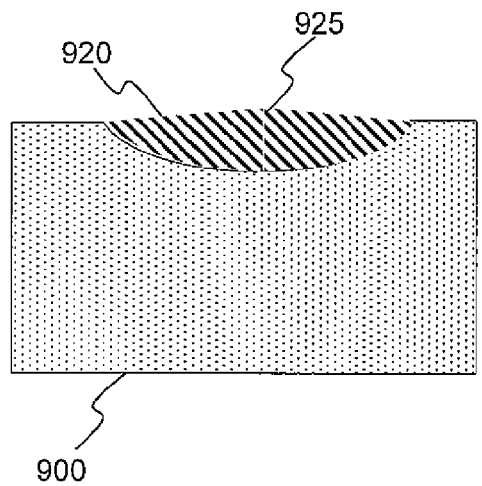
FIG. 9                FIG. 10
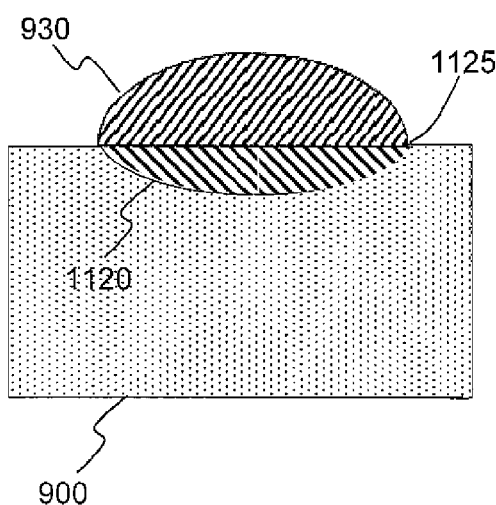
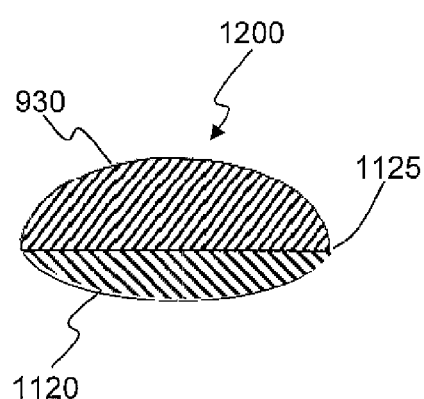
FIG. 11               FIG. 12

DEFORMABLE LENS ASSEMBLY

FIELD

The subject matter disclosed herein relates to an imaging device having a deformable lens.

BACKGROUND

Many portable electronic apparatuses, such as a cellular phone and/or a personal digital assistant (PDA) for example, may comprise a compact camera module. Such a module may comprise an image sensor, an imaging lens assembly, and/or an actuator to adjust the position of the imaging lens assembly with respect to the image sensor. As designers push towards slimmer, smaller, and/or lighter portable electronic apparatuses, compact camera module manufacturers, among others, are facing a challenge of providing smaller compact camera modules that can be integrated with reduced form factors. In addition, a push towards increasingly lower manufacturing costs persists for compact camera modules having ever-increasing performance.

BRIEF DESCRIPTION OF THE DRAWINGS

Non-limiting and non-exhaustive embodiments will be described with reference to the following objects, wherein like reference numerals refer to like parts throughout the various objects unless otherwise specified.

FIG. 9 is a cross-section of a mold, according to an embodiment.

FIG. 10 is a cross-section of a mold filled with an elastic material, according to an embodiment.

FIG. 11 is a cross-section of a mold filled with an elastic material covered by a rigid lens portion, according to an embodiment.

FIG. 12 is a cross-section of a deformable lens, according to an embodiment.

DETAILED DESCRIPTION

Figure 1:
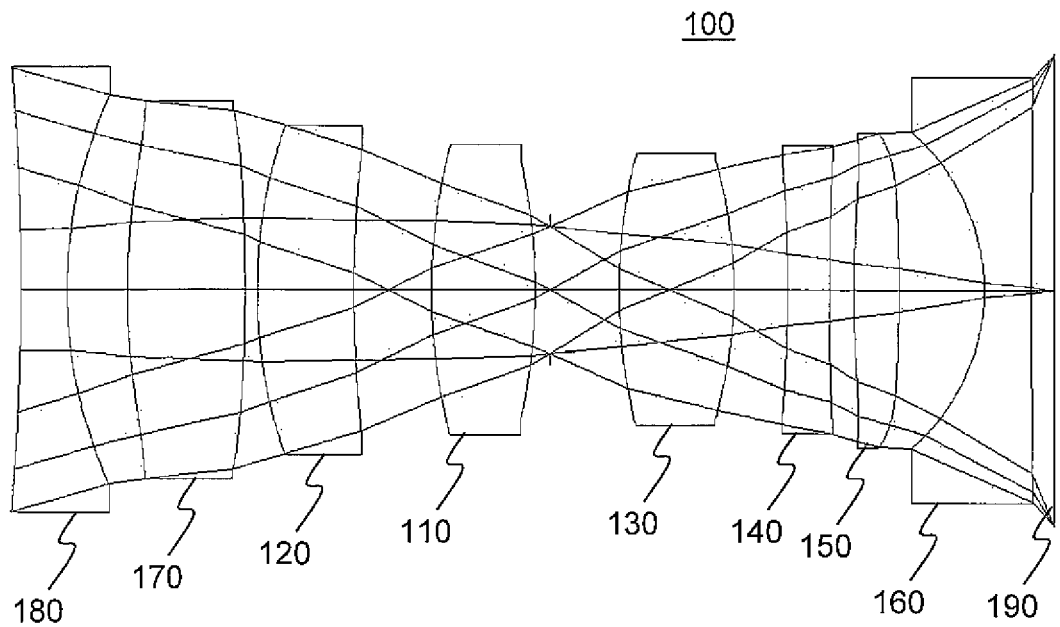
FIG. 1 is a side view of a lens assembly, according to an embodiment.

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

Likewise, the terms, "and," "and/or," and "or" as used herein may include a variety of meanings that also is expected to depend at least in part upon the context in which such terms are used. Typically, "or" as well as "and/or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe some combination of features, structures, or characteristics. Though, it should be noted that this is merely an illustrative example and claimed subject matter is not limited to this example.

In an embodiment, a lens assembly may include two or more lenses, wherein at least one of the lenses comprises a deformable lens and another of the lenses comprises a rigid lens. A deformable lens may have a shape and/or surface that is deformed by application of a force on at least a portion of the deformable lens. Such a force may be implemented using a rigid lens or other element type in contact with a deformable lens. For example, in one implementation, a deformable lens and a rigid lens may be brought into contact with one another with a force sufficient to deform a shape of the deformable lens. In another implementation, a deformable lens and a flat, rigid, transparent plate (e.g., a wave-plate, an optical filter, and/or a glass or plastic plate, just to name a few examples) may be brought into contact with one another with a force sufficient to deform a shape of the deformable lens. A shape of a deformed lens may conform to a shape of a rigid lens (or other element type) used to deform the deformable lens. Deforming a lens may comprise a technique to adjust focal point, magnification, and/or other parameters of a lens assembly that incorporates a deformable lens. An actuator may be used to move a deformable lens and a rigid lens together or apart so as to selectively deform a surface of the deformable lens. Incorporating such a deformable lens in a lens assembly may provide advantages over lens assemblies that do not include deformable lenses. Advantages may include lower-cost lens assembly, greater lens design freedom, improved reliability, and reduced lens count, just to name a few examples.

Figure 4:
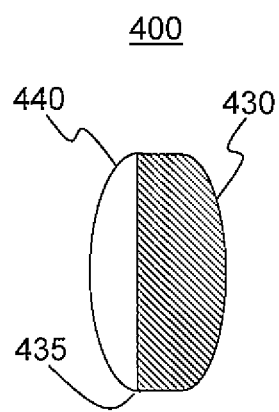
FIG. 4 is a side view of a deformable lens, according to an embodiment.

In one implementation, a deformable lens may comprise an optical element that is rigid on one side and deformable on the other side. A deformable lens may comprise a glass or rigid plastic lens having an optical surface coated with an optically transparent flexible material such as a urethane or silicone material, just to name a few examples. FIG. 4 is a side view of a deformable lens 400, according to an embodiment. Rigid portion 430 may comprise glass or a rigid plastic material having optical properties, such as relatively high transmittance and an index of refraction. An optically transparent elastic portion 440, disposed on a surface 435 of rigid portion 430, may comprise a flexible, elastic material that deforms under pressure from contact with an object. For example, if deformable lens 400 and/or an object (e.g., another lens) is moved so that elastic portion 440 comes into contact with the object, the shape of elastic portion 440 may deform, as explained in further detail below. A lens assembly may incorporate any number of deformable lenses, which may vary in shape, size, and/or material, and claimed subject matter is not limited in this respect.

A deformable lens may be attached to one portion of an actuator and a rigid lens may be attached to another portion of an actuator so that the deformable lens and the rigid lens may be selectively brought into contact (e.g., a contact state) or separated (e.g., a non-contact state) by operating the actuator. For example, an electromagnetic actuator may comprise an electromagnetic coil attached to a deformable lens and a permanent magnet may be attached to a rigid lens. Applying a current in the electromagnetic coil may result in an elastic portion of a deformable lens being brought into a contact state with a surface of a rigid lens. A force of compression between a deformable lens and a rigid lens may lead to deformation of the elastic portion of the deformable lens into a shape that conforms to at least a portion of the shape of the rigid lens. For example, a surface of an elastic portion of a deformable lens in a non-contact state may comprise a convex shape. The surface of the elastic portion may be changed to a flat shape in a contact state with a rigid lens having a flat shape. In another example, a surface of an elastic portion of a deformable lens in a non-contact state may comprise a convex shape having a particular radius of curvature. The surface of the elastic portion may be changed to a convex shape having a reduced radius of curvature in a contact state with a rigid lens. In yet another example, the surface of an elastic portion of a deformable lens in a non-contact state may comprise a convex shape. The surface of the elastic portion may be changed to a concave shape in a contact state with a rigid lens. A deformable lens, once removed from contact by a rigid lens, may return to an original non-deformed shape. Of course, particular shapes of lenses are merely example, and claimed subject matter is not so limited.

In an embodiment, a method of operating an optical assembly may comprise adjusting a magnification, focus, and/or other optical parameter of a lens assembly by selectively contacting a deformable lens with a rigid lens or separating the deformable lens and the rigid lens from one another. As mentioned above, the shape of a deformable lens may comprise one shape if the deformable lens is contacting a rigid lens, whereas the shape of the deformable lens may comprise another shape if the deformable lens is separated from the rigid lens. For example, the shape of at least a portion of a surface of a deformable lens may conform to the shape of at least a portion of a surface of a rigid lens if the deformable lens and the rigid lens are in physical contact. In one implementation, contacting a deformable lens with a rigid lens may comprise moving the deformable lens toward the rigid lens, or moving the rigid lens toward the deformable lens, or moving both the deformable lens and the rigid lens toward one another. An actuator may be operated to perform such movements of a deformable lens and/or a rigid lens, though claimed subject matter is not so limited.

FIG. 1 is a side view of a lens assembly 100, according to an embodiment. Lens assembly 100 may be incorporated in an optical zoom lens, for example. Lens assembly 100 may include a deformable lens 110 and a deformable lens 130, though an optical assembly may include any number of such lenses, and claimed subject matter is not limited in this respect. Lens assembly 100 may comprise a zoom lens and be, for example, incorporated in a camera. A rigid lens 120 may be positioned adjacent to deformable lens 110 and a rigid lens 140 may be positioned adjacent to deformable lens 130. In other implementations, rigid lens 120 and/or 140 may comprise another element type, such as a flat, transparent plate, for example. Claimed subject matter is not limited to any particular type or shape of rigid element(s). Lens assembly 100, also including lenses 180, 170, 150, and 160, may receive collimated light at lens 180 and produce an image focused at a focal plane 190 (e.g., a screen) on the right side of FIG. 1. A (focus) distance between focal plane 190 and exit lens 160 may depend, at least in part, on relative spacing of lenses 110 through 180, shapes of lenses, and/or materials of which the lenses are made. In particular, shapes of deformable lenses 110 and 130 may be selectively changed to adjust magnification, focus, and/or other optical parameter of lens assembly 100. In a particular implementation, deformable lens 110 and rigid lens 120 may be mounted so as to be moveable with respect to one another. Deformable lens 130 and rigid lens 140 may also be mounted so as to be moveable with respect to one another.

Figure 2:
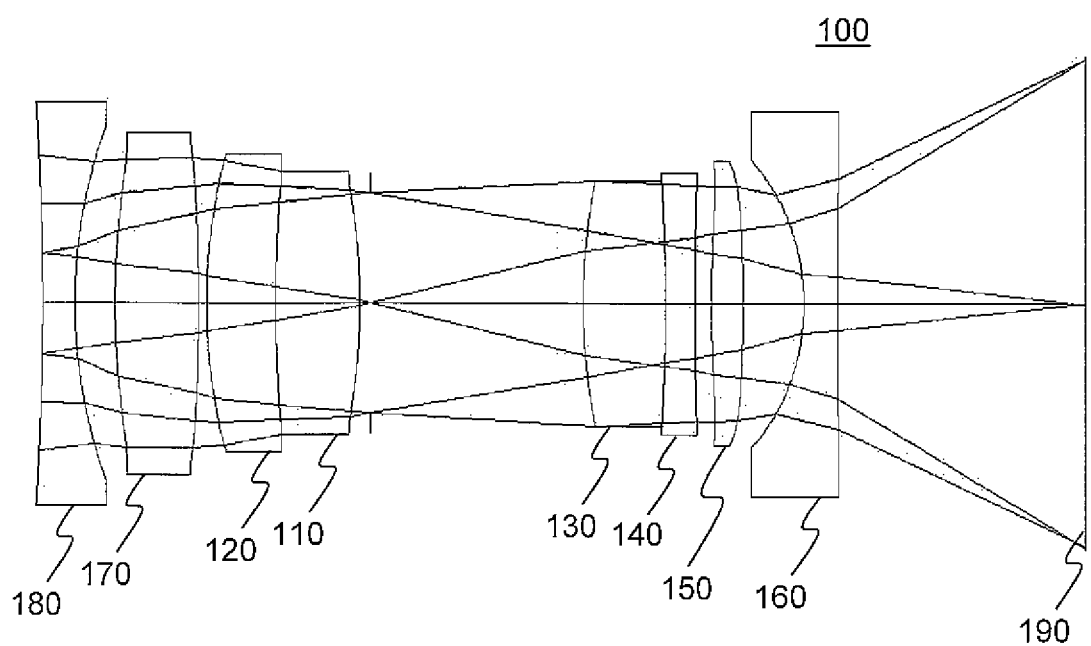
FIG. 2 is a side view of a lens assembly, according to another embodiment.

FIG. 2 shows lens assembly 100 in a configuration different from that shown in FIG. 1. Using one or more actuators (not shown), for example, deformable lens 110 and rigid lens 120 may be brought together, resulting in a shape of deformable lens 110 being changed to conform to a shape of rigid lens 120. Also, deformable lens 130 and rigid lens 140 may also be brought together, resulting in a shape of deformable lens 130 being changed to conform to a shape of rigid lens 140. As a result of changing shape of deformable lenses 110 and 130, a distance between exit lens 160 and focal plane 190 may be increased relative to that shown in FIG. 1, where deformable lenses 110 and 130 comprise a non-contact (e.g., non-deformed) shape. Claimed subject matter is not limited to either a deformable lens moving into contact with a rigid lens (or other element type) or a rigid lens (or other element type) moving into contact with a deformable lens. Also, in some implementations, both a deformable lens and a rigid lens (or other element type) may both move (e.g., relative to a structure of a lens assembly in which the deformable lens and the rigid lens (or other element type) are included) to contact one another.

Figure 3:
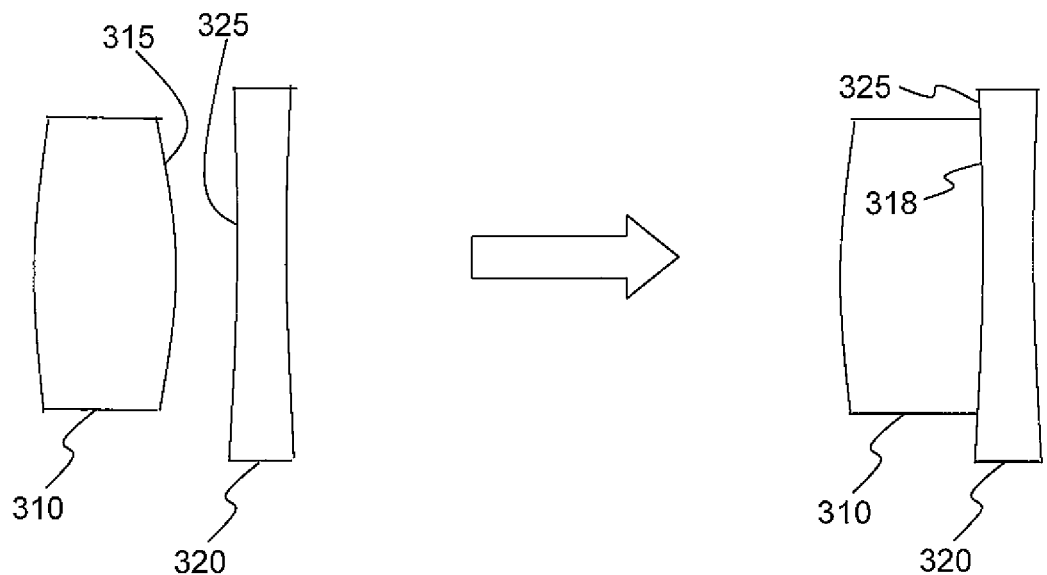
FIG. 3 is a side view of deformable and rigid lenses, according to an embodiment.

FIG. 3 is a side view of a deformable lens 310 and a rigid lens 320, according to an embodiment. Deformable lens 310 may comprise an elastic material that may deform while in contact with an external object. For example, surface 315 of deformable lens 310 may change shape to conform to a shape of surface 325 of rigid lens 320. In the left side of FIG. 3, deformable lens 310 and rigid lens 320 are separated and surface 315 of deformable lens 310 has a particular shape (e.g., radius of curvature). In the right side of FIG. 3, deformable lens 310 and rigid lens 320 are in contact with one another and surface 315 of deformable lens 310 has a different shape 318, corresponding to a shape of surface 325 of rigid lens 320. In another implementation, rigid lens 320 may be replaced with a flat plate, such as an optical filter, for example.

As described above, FIG. 4 is a side view of a deformable lens 400, according to an embodiment. Although a double-convex lens is shown, claimed subject matter is not so limited. Either or both surfaces of lens 400 may comprise flat or concave surfaces, for example. Deformable lens 400 may comprise an elastic portion 440 and a rigid portion 430. Elastic portion 440 may comprise a material having optical properties, such as relatively high transmittance and a refractive index, for example. Elastic portion 440 may comprise an elastic material formed by a process of curing a liquid material in a mold. As explained in further detail below, a particular process to form elastic portion 440 may include pouring a liquid material into a mold, allowing the material to solidify into a flexible rubber-like material, and removing the material from the mold. For example, elastic portion 440 may comprise silicone-type materials, such as silicone LS-3238 manufactured by AB Technology Group, Ontario, Canada, though claimed subject matter is not so limited. Other examples of a deformable material may include: Silicone QGe1920 manufactured by Quantum Silicones, Virginia, United State; and silicone OE-6450 manufactured by Dow Corning, N.Y., United States. Desirable properties of a deformable material may include a relatively high optical transmittance and a relatively small durometer value and/or young modulus. A desirable value for optical transmittance, for example, may be above about 90%. For desirable durometer values, a material may be within the shore 00 scale and may be less than about 50.

Figure 5:
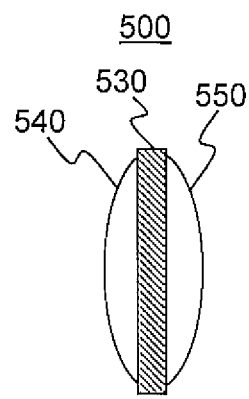
FIG. 5 is a side view of a deformable lens, according to another embodiment.

FIG. 5 is a side view of a deformable lens 500, according to another embodiment. As mentioned above for lens 400, although lens 500 is shown as a double-convex lens, claimed subject matter is not so limited. Either or both surfaces of lens 500 may comprise flat or concave surfaces, for example. Deformable lens 500 may comprise elastic portions 540 and 550 sandwiching a rigid portion 530. Though shown in FIG. 5, rigid portion 530 need not comprise flat surfaces. Elastic portions 540 and/or 550 may comprise a cured liquid material having optical properties, such a silicone-type material, though claimed subject matter is not so limited.

Figure 6:
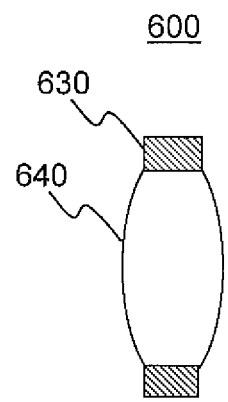
FIG. 6 is a side view of a deformable lens, according to yet another embodiment.

FIG. 6 is a side view of a deformable lens 600, according to yet another embodiment. As mentioned above for lens 400, although lens 600 is shown as a double-convex lens, claimed subject matter is not so limited. Either or both surfaces of lens 600 may comprise flat or concave surfaces, for example. Deformable lens 600 may comprise a rigid portion 630 having a ring shape at least partially filled with elastic portion 640. Of course, such shapes are merely examples, and claimed subject matter is not so limited.

Figure 7:
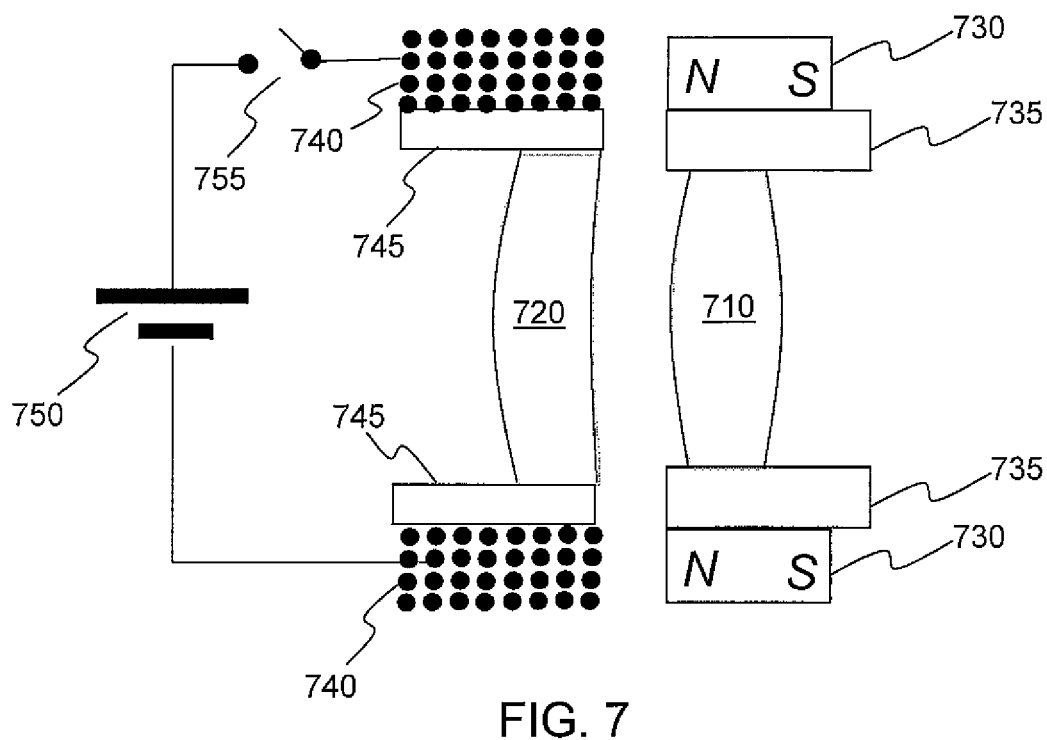
FIG. 7 is a cross-section of deformable and rigid lenses mounted to an actuator, according to an embodiment.

FIG. 7 is a cross-section of deformable and rigid lenses mounted to an actuator, according to an embodiment. For example a lens assembly may include an electromagnetic actuator having a coil that moves a portion of a lens assembly if the coil is energized. In another configuration, a lens assembly may comprise an actuator having a coil and a magnet, wherein the magnet may move a portion of a lens assembly if the coil is energized. Coil 740 may comprise multiple loops of wire. An electrical current travelling through such loops may induce a magnetic field to impart a force on a magnet, such as magnet 730, for example. In such a case, a spring (not shown) may provide a restoring force to counter such a magnetic force, thereby providing a mechanism to press deformable lens 710 and rigid lens 720 together.

In one implementation, deformable lens 710 may be attached to one or more permanent magnets 730 of an actuator. A frame 735 rigidly fixed to permanent magnets 730 may be used to mount lens 710, though such a frame need not be included in other implementations. Rigid lens 720 may be attached to coil 740 of an electromagnetic actuator. A frame 745 rigidly fixed to coil 740 may be used to mount lens 720, though such a frame need not be included in other implementations. Coil 740 may be electrically connected to a power source 750 via a switch 755 to selectively activate or deactivate a magnetic force generated by coil 740. As shown in FIG. 7, switch 755 may be in an open position so that coil 740 may not receive power. In such a case, a magnetic force may not be present to affect magnets 730. In one implementation, a spring (not shown) may be used to maintain a separation between coil 740 and magnets 730 or between deformable lens 710 and rigid lens 720, for example.

Figure 8:
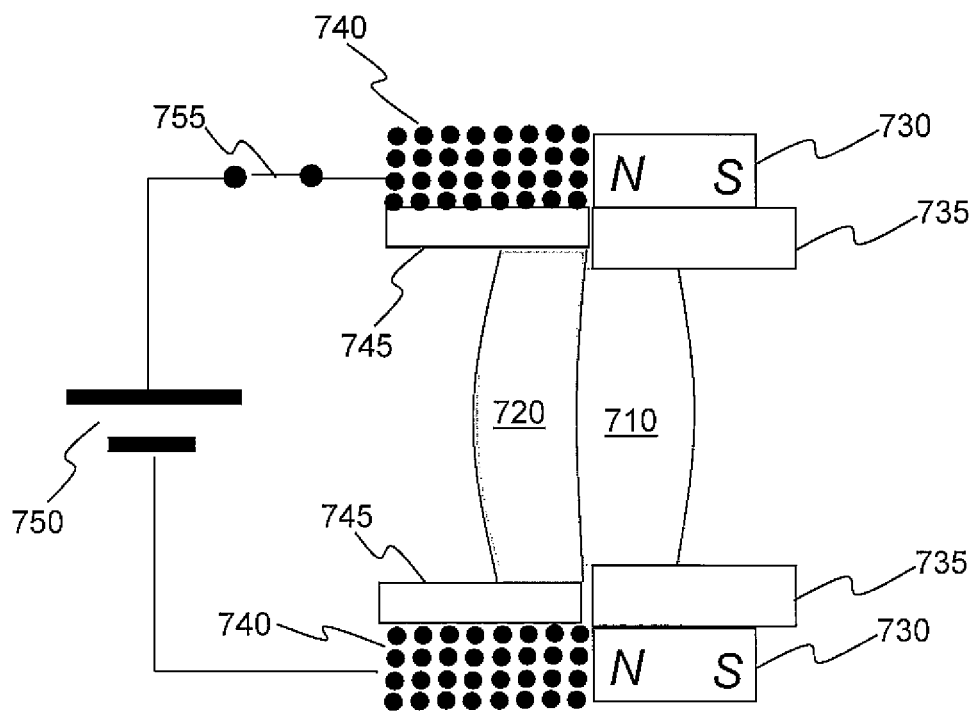
FIG. 8 is a cross-section of deformable and rigid lenses mounted to an actuator, according to another embodiment.

In FIG. 8, switch 755 may be in a closed position so that coils 740 may receive power from power source 750. In such a case, a magnetic force may be present to attract magnets 730 toward coils 740. As a result, coils 740 and magnets 730 may be brought into contact with one another and a shape of deformable lens 710 may be changed to conform to a shape of rigid lens 720, for example. In other embodiments, actuator coils and magnets may be rearranged so that a repulsive magnetic force between coils and magnets may result in deformable lens 710 and rigid lens 720 being brought into contact with one another. Claimed subject matter is not limited to any particular arrangement or configuration of actuator components or lenses. In other embodiments, an actuator may comprise a piezoelectric actuator, an electro-active polymer, or a motor-gear system. For example, one type of electro-active polymer may comprise an ionic polymer metal composite (IPMC). If electric current is applied to the composite material, ions may be lined-up on one surface of the material, leading to bending of the material. In one particular implementation, an electro-active polymer used as an actuator may be made into a ring shape, with a deformable lens attached across the center hole of the ring. If electric current is applied to the polymer, the lens may be pushed in a direction consistent with the bending of the actuator. This motion may be used to press a deformable lens against another lens (e.g., a rigid lens) or other optical element.

FIG. 9 is a cross-section of a mold 900 that may be used to form an elastic portion of a deformable lens. For example, an elastic portion may be similar to elastic portion 440 shown in FIG. 4. Mold 900 may comprise a recessed region 910 to hold liquid material that may cure to an elastic state, described below. For example, mold 900 may comprise a rigid material, such as ceramic, plastic, or metal, that may be sufficiently durable to use in multiple processes of forming elastic portions of a deformable lens. Although recessed region 910 is shown having a concave bottom, other shapes may be used. For example, a concave bottom may result in an elastic portion of a convex deformable lens, whereas a convex bottom may result in an elastic portion of a concave deformable lens. Claimed subject matter is not limited to any particular shape of recessed region 910.

In an embodiment, a particular process to form an elastic portion of a lens, such as portion 440, for example, may include pouring a liquid material into recessed region 910 and, depending on the type of liquid material used, heating and/or adding a catalyst to the material to solidify the material over time (e.g., several seconds, minutes, or hours). Such a process of solidifying a liquid, known as "curing", may result in a flexible rubber-like (though optically transparent) material. FIGS. 10-12 further describe such a process of forming an elastic portion of a deformable lens. In one particular implementation, an elastic portion of a deformable lens may be molded using a room-temperature, ultra-precision process, where ultra-violet (UV)-curable silicone is placed in a high-precision mold. Then, a rigid portion of the deformable lens may be pressed against the mold while UV light shines onto the silicone area. Because of the room temperature operation, shrinkage of the elastic portion during molding may be greatly reduced, and hence the molding may achieve ultra-high precision.

FIG. 10 is a cross-section of mold 900 filled with an elastic material 920, according to an embodiment. Elastic material 920 may comprise a liquid material that cures to have optical properties such as relatively high transmittance and a refractive index, for example. In particular, an adhesive may comprise a refractive index that is approximately the same as that of a rigid lens portion (e.g., 930 shown in FIG. 11) that may be combined with cured elastic material 920 to form a deformable lens (e.g., 1200 shown in FIG. 12), for example.

A bump 925 may comprise a raised region of elastic material 920 resulting, at least in part, from surface tension of the elastic material. In some implementations, however, such a bump need not occur or may be negligible so that the bump is substantially flat, for example.

FIG. 11 is a cross-section of mold 900 filled with an elastic material 1120 covered by a rigid lens portion 930, according to an embodiment. A top surface of elastic material 1120 comprising interface 1125 may be substantially flat. In one implementation, a bump, such as 925 shown in FIG. 10, may change shape to conform to a shape of rigid lens portion 930. For example, a bump may flatten to conform to a flat-shaped surface of a rigid lens. In another implementation, a bump or other portions of a surface of material in mold 900 may be polished and/or ground to a particular (e.g., flat) surface shape. Techniques for polishing or grinding an elastic material may involve cooling the material so that it transitions to a relatively inelastic state, for example. Rigid lens portion 930 may comprise glass or plastic having optical properties, such as relatively high transmittance and a refractive index that may be substantially similar to that of elastic portion 1120.

Rigid lens portion 930 may be fixed to elastic portion 1120 with an adhesive (not shown) applied to a contact surface of rigid lens portion 930 and/or to a contact surface of elastic portion 1120 before the portions are mated. Such an adhesive may comprise a material that is optically transparent. Additionally, an adhesive may comprise a refractive index that is approximately the same as that of rigid lens portion 930 and/or elastic portion 1120, for example. In other words, an adhesive may comprise an index-matching material to bond together rigid lens portion 930 and elastic portion 1120, though claimed subject matter is not so limited.

FIG. 12 is a cross-section of a deformable lens 1200, according to an embodiment. Lens 1200 may result from removing combined rigid lens portion 930 and elastic portion 1120 from mold 900, as shown in FIG. 11, for example. Deformable lens 1200 may be included in a lens assembly so that elastic portion 1120 faces a rigid lens, such as 720 shown in FIG. 7, for example. Deformable lens 1200 may be attached to a portion of an actuator. A rigid lens may be attached to another portion of the actuator. Activation of an actuator may apply a force to push a deformable lens and a rigid lens together so as to deform a surface of elastic portion 1120 to a shape that at least partially matches that of a shape of the rigid lens. Of course, details of producing a deformable lens and applying it in a lens assembly are merely examples, and claimed subject matter is not so limited.

One skilled in the art will realize that a virtually unlimited number of variations to the above descriptions is possible, and that the examples and the accompanying figures are merely to illustrate one or more particular implementations.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. An apparatus comprising:
   a lens assembly including two or more optical elements, wherein at least one of said optical elements comprises a deformable lens and another of said optical elements comprises a rigid optical element; and
   an actuator to move said deformable lens and/or said rigid optical element into contact with each other with a force sufficient to deform a surface of said deformable lens, wherein the deformation of said surface of said deformable lens occurs in response to a force of compression between said deformable lens and said rigid optical element.

2. The apparatus of claim 1, wherein said surface of said deformable lens is deformed based, at least in part, on a shape of said rigid optical element if said deformable lens and said rigid optical element are in contact together.

3. The apparatus of claim 1, wherein said deformable lens comprises a rigid portion and an elastic portion.

4. The apparatus of claim 3, wherein said rigid portion comprises a ring shape at least partially filled with said elastic portion.

5. The apparatus of claim 1, wherein said deformable lens comprises an elastic portion molded onto a rigid portion.

6. The apparatus of claim 1, wherein said deformable lens comprises a rigid portion sandwiched by two elastic portions.

7. The apparatus of claim 1, wherein said actuator comprises an electromagnetic coil attached to one of said deformable lens and said rigid optical element and a permanent magnet attached to the other of said deformable lens and said rigid optical element.

8. The apparatus of claim 1, wherein said actuator comprises a piezoelectric actuator.

9. The apparatus of claim 1, wherein said actuator comprises an electro-active polymer.

10. The apparatus of claim 1, wherein said actuator comprises a motor-gear system.

11. The apparatus of claim 1, wherein magnification or focus of said lens assembly is adjustable based on whether said deformable lens and said rigid optical element are separated from one another or in contact with one another.

12. The apparatus of claim 1, wherein said lens assembly is implemented in an optical zoom camera module.

13. The apparatus of claim 1, wherein the shape of said deformable lens comprises one shape if said deformable lens is contacting said rigid optical element and the shape of said deformable lens comprises another shape if said deformable lens is separated from said rigid optical element.

14. The apparatus of claim 1 wherein said actuator is a two state actuator to move said deformable lens and said rigid optical element between a non-contact state and a contact state.

15. The apparatus of claim 14, wherein said rigid optical element is a rigid lens.

16. The apparatus of claim 15, wherein said deformable lens comprises an optical element that is rigid on one side and deformable on another side.

* * * * *